United States Patent [19]
Tronco

[11] Patent Number: 5,823,595
[45] Date of Patent: Oct. 20, 1998

[54] WORK BENCH

[76] Inventor: Nicholas A. Tronco, 314 Bates Mill Rd., Waterford, N.J. 08089

[21] Appl. No.: 677,091

[22] Filed: Jul. 9, 1996

[51] Int. Cl.⁶ ............................................. B62D 33/023
[52] U.S. Cl. ................................ 296/26.03; 296/57.1
[58] Field of Search .................... 296/26, 57.1; 108/129, 108/65, 69, 70, 44

[56] References Cited

U.S. PATENT DOCUMENTS

| | | | |
|---|---|---|---|
| 784,781 | 3/1905 | Davis | 108/65 |
| 1,639,879 | 8/1927 | Buffington | |
| 1,724,811 | 8/1929 | Viehmann | 108/65 |
| 1,925,216 | 9/1933 | Swartz | 108/69 X |
| 2,451,275 | 10/1948 | Cercownay | 108/44 X |
| 2,606,786 | 8/1952 | Howard | 296/61 |
| 2,686,060 | 10/1954 | Couse | |
| 4,944,546 | 7/1990 | Keller | 296/61 |
| 5,169,202 | 12/1992 | Cupp et al. | 296/51 |
| 5,328,225 | 7/1994 | Melching et al. | 296/26 |
| 5,425,564 | 6/1995 | Thayer | 296/61 |

FOREIGN PATENT DOCUMENTS

| | | | |
|---|---|---|---|
| 0372284 | 6/1990 | European Pat. Off. | 108/129 |
| 1100664 | 9/1955 | France | 108/129 |

*Primary Examiner*—Dennis H. Pedder
*Attorney, Agent, or Firm*—Thomas A. Lennox; James J. Murtha

[57] ABSTRACT

A long work bench stored in a folded up package attached by a hinged bracket to the inside surface of a pickup truck tailgate to swing rearwardly while still attached. The work bench includes a central table the length of the tailgate section, a pair of first end table sections attached by hinges to the outer ends of the central section, and a pair of second end table sections attached by hinges to the outer ends of the first end table sections to form a sixteen foot work surface with adjustable height legs that pivot away when stored against the tailgate.

7 Claims, 4 Drawing Sheets

WORK BENCH

BACKGROUND OF THE INVENTION

This invention is directed to a work bench and, more particularly, a work bench that is detachably attached and stored on the inside surface of the tailgate of a pickup truck.

Trade persons, particularly carpenters, siding installers, and the like have need of a stable, relatively large sized work area at an outdoor construction site, particularly a long work bench. Space in the back of such a truck is almost always a premium. Portable work benches are regularly employed but are either bulky and hard to transport and set up or are of limited size with insufficient stability for large construction projects.

Pickup trucks and other truck like vehicles have fold down rear tailgates which can serve as a rudimentary work surface. These tailgates, however, are not designed and constructed for such heavy use. Firstly, these tailgates generally do not provide a truly flat surface or ready means to permit attachment of tools and clamps which are employed at the work site. Most importantly, conventional fold down tailgates are not designed to hold a significantly greater weight, generally employing a pair of angle members extending from the truck body to the edge of the tailgate for support. These angle members limit and obstruct general use of the tailgate as a work surface.

A multiple use work bench for use as a tailgate on a truck is disclosed in U.S. Pat. No. 5,169,202 to Cupp, et al. The tailgate is shown with a ramp member with legs added resting on the edge of the tailgate bench to form an "L" shaped work area. In U.S. Pat. No. 4,944,546 to Keller, a foldable trunk ramp is shown where the ramp is constructed of three sections hingeably attached to each other, which when folded together form the tailgate for the truck. Another combined end gate and ramp is disclosed in U.S. Pat. No. 1,639,879 to Buffington, where an upper section is hingeably attached and folds downwardly for use as a ramp. In the Buffington device, ramp sidewalls are hingeably attached to fold into the tailgate when not in use. In U.S. Pat. No. 2,606,786 to Howard, a panel-type truck body is equipped with hinged panels that form platforms. The platforms are hinged along their bottom edge and drop down to a horizontal work table configuration. A laterally extensible section slides into channels to extend the work surface. In U.S. Pat. No. 5,425,564 to Thayer, a removable tailgate is utilized as an adjustable width ramp. In U.S. Pat. No. 5,328,225 to Melching, et al, a structure is mounted on a conventional tailgate of a pickup truck to enable the user to quickly enlarge the load-carrying portion of the truck. The device includes a set of four plates, hinged one to another, extending rearwardly from the rear of the tailgate. In U.S. Pat. No. 2,686,060 to Couse, a rear truck door is convertible to a trailer or a dolly.

None of these devices satisfy the needs described above nor attain the objects described herein below.

SUMMARY OF INVENTION

It is an object of the protection sought to provide a work bench that is installed and detachably attached on the inside surface of a truck tailgate.

It is a further object of the protection sought to provide a work bench that when folded outwardly to the rear can then be extended lengthwise by folding out additional panels to the right and to the left of the central table.

It is also an object of the protection sought to provide a work bench that can be folded outwardly to the rear of the tailgate to a working position while remaining attached to the tailgate for added support and stability.

It is an additional object of the protection sought to provide a sixteen foot long work bench that folds out from a storage position in a package no more than about three inches thick.

It is a further object of the protection sought to provide an elongated work surface which can be adjusted to form a ramp or a gull wing shape.

It is a particular object of the protection sought to provide a work bench that provides a stable surface regardless of the uneven surface of the ground.

An aspect of the invention is a work bench apparatus that includes a work bench that includes an elongate central table section comprising an upper work surface, a lower surface, a front lengthwise edge, a rear lengthwise edge, and end edges, and at least one elongate end table section including an upper work surface, a lower surface, a near end edge, and a outer end edge. The work bench further includes a plurality of hinge attachment means to detachably and hingeably attach adjacently positioned edges of the table sections together including means to detachably hingeably attach the near end edge of the end table section to an end edge of the central table section allowing the end table section to swing from a first position with the upper work surface of the end table section abutting the upper work surface of the central table section to a second position with the end table section in a horizontal position with the upper work surface of the end table section facing upwardly. When all table sections are in their respective first positions, the size and shape of the end table section allows the combination of the upper work surfaces of both of the end table section to abut and be essentially coterminous with the upper work surface of the central table section at same time. The work bench further includes pivotably attached leg means to support the work bench apparatus at a chosen height with the upper work surfaces of all the table sections facing upwardly. The apparatus further includes means to detachably attach the work bench to an inside surface of a tailgate of an truck that includes means to detachably attach the rear lengthwise edge of the elongate central table section to inside surface of a tailgate, and means to allow the work bench to swing from a first work bench position abutting the inside surface of the tailgate to a second work bench position with the upper work surface of the elongate central table facing upwardly and positioned outwardly and rearwardly from the tailgate while still attached to the tailgate.

It is preferred that there be two elongate end table sections each comprising an upper work surface, a lower surface, a near end edge, and a outer end edge, that the hinge attachment means detachably and hingeably attaches the near end edges of the end table section to an end edges of the central table sections allowing the end table sections to swing from a first position with the upper work surface of the end table section abutting the upper work surface of the central table section to a second position with the end table sections in a horizontal position with the upper work surface of the end table sections facing upwardly, and that the combination of the size and shape of the end table sections allow the combination of the upper work surfaces of both of the end table sections to abut and be essentially coterminous with the upper work surface of the central table section at same time.

Another aspect of the invention is a work bench apparatus that includes a work bench that includes an elongate central table section comprising an upper work surface, a lower surface, a front lengthwise edge, a rear lengthwise edge, and end edges and a pair of elongate end table sections each comprising an upper work surface, a lower surface, a near end edge, and a outer end edge. The work bench further includes a plurality of hinge attachment means to detachably and hingeably attach adjacently positioned edges of the table sections together comprising a means to detachably hingeably attach the near end edges of the end table sections to the end edges of the central table section allowing the end table sections to swing from a first position with the upper work surfaces of the end table sections abutting the upper work surface of the central table section to a second position with the end table sections in a horizontal position with the upper work surfaces of the first end table sections facing. When all table sections are in their respective first positions, the size and shape of the end table sections allow the combination of the upper work surfaces of both of the end table sections to abut and be essentially coterminous with the upper work surface of the central table section at same time. The work bench further includes pivotably attached leg means to support the work bench apparatus at a chosen height with the upper work surfaces of all the table sections facing upwardly. The apparatus further includes means to detachably attach the work bench to an inside surface of a tailgate of an truck and includes means to detachably attach the rear lengthwise edge of the elongate central table section to inside surface of a tailgate, and means to allow the work bench to swing from a first work bench position abutting the inside surface of the tailgate to a second work bench position with the upper work surface of the elongate central table facing upwardly and positioned outwardly and rearwardly from the tailgate while still attached to the tailgate.

It is preferred that the further include a pair of elongate second end table sections each comprising an upper work surface, a lower surface, a near end edge, and a outer end edge, and second means to detachably hingeably attach the outer end edges of the end table sections to the inner end edges of the second end table sections allowing the second end table sections to swing from a first position with the lower surfaces of the second end table sections abutting the lower surfaces of the end table sections to a second position with the second end table sections in a horizontal position with the upper work surfaces of the second end table sections facing upwardly. When all table sections are in their respective first positions, the size and shape of the second end table sections allow the lower surfaces of both of the end table sections to abut the lower surfaces of the end table sections at same time.

Yet another aspect of the invention is a work bench apparatus that includes means to detachably attach a work bench to an inside surface of a tailgate of an truck and to provide the capability of swinging the work bench from a first position abutting the inside surface of the tailgate to a second position outwardly and rearwardly from the tailgate while still attached to the tailgate. The apparatus further includes the work bench that includes an elongate central table section that includes an upper work surface, a lower surface, a front lengthwise edge, a rear lengthwise edge, and end edges. The work bench further includes a pair of elongate first end table sections each comprising an upper work surface, a lower surface, a near end edge, and a outer end edge, and a pair of elongate second end table sections each comprising an upper work surface, a lower surface, a near end edge, and a outer end edge. The apparatus further includes a plurality of hinge attachment means to detachably and hingeably attach adjacently positioned edges of the table sections together. The plurality of hinge attachment means includes a first means to detachably hingeably attach the near end edges of the first end table sections to the end edges of the central table section allowing the first end table sections to swing from a first position with the upper work surfaces of the first end table sections abutting the upper work surface of the central table section to a second position with the first end table sections in a horizontal position with the upper work surfaces of the first end table sections facing upwardly. The plurality of hinge attachment means also includes a second means to detachably hingeably attach the outer end edges of the first end table sections to the inner end edges of the second end table sections allowing the second end table sections to swing from a first position with the lower surfaces of the second end table sections abutting the lower surfaces of the first end table sections to a second position with the second end table sections in a horizontal position with the upper work surfaces of the second end table sections facing upwardly. When all table sections are in their respective first positions, the size and shape of the first end table sections allow the upper work surfaces of both of the first end table sections to abut the upper work surface of the central table section at same time. When all table sections are in their respective first positions, the size and shape of the second end table sections allow the lower surfaces of both of the second end table sections to abut the lower surfaces of the first end table sections at same time. The apparatus further includes pivotably attached leg means to support the work bench apparatus at a chosen height with the upper work surfaces of all the table sections facing upwardly.

All of the following preferred embodiments may pertain to any of the aspects of the invention described herein above. It is preferred that the leg means be individually lengthwise adjustable. It is further preferred that the leg means include legs depending from the lower surface proximate all four corners of the central table section, legs depending from lower surfaces proximate ends of the hinge attachment means attaching the outer edges of the first end table sections and the inner edges of the second end table sections, and legs depending from the lower surfaces of the second end table sections proximate ends of the outer edges thereof. It is also preferred that the plurality of hinge attachment means further include third means to detachably hingeably attach the near edges of the first end table sections to the rear lengthwise edge of the central table section. It is further preferred that the plurality of hinge attachment means further include means to detachably hingeably attach any of four edges of the first end table sections adjacently positioned to any of four edges of the central table section. It is preferred that the plurality of hinge attachment means further include means to detachably hingeably attach any of four edges of the second end table sections adjacently positioned to any of four edges of the first end table section.

BRIEF DESCRIPTION OF THE DRAWINGS

FIG. 3a is an right side elevational view thereof.

DESCRIPTION OF PREFERRED EMBODIMENTS

Figure 1:
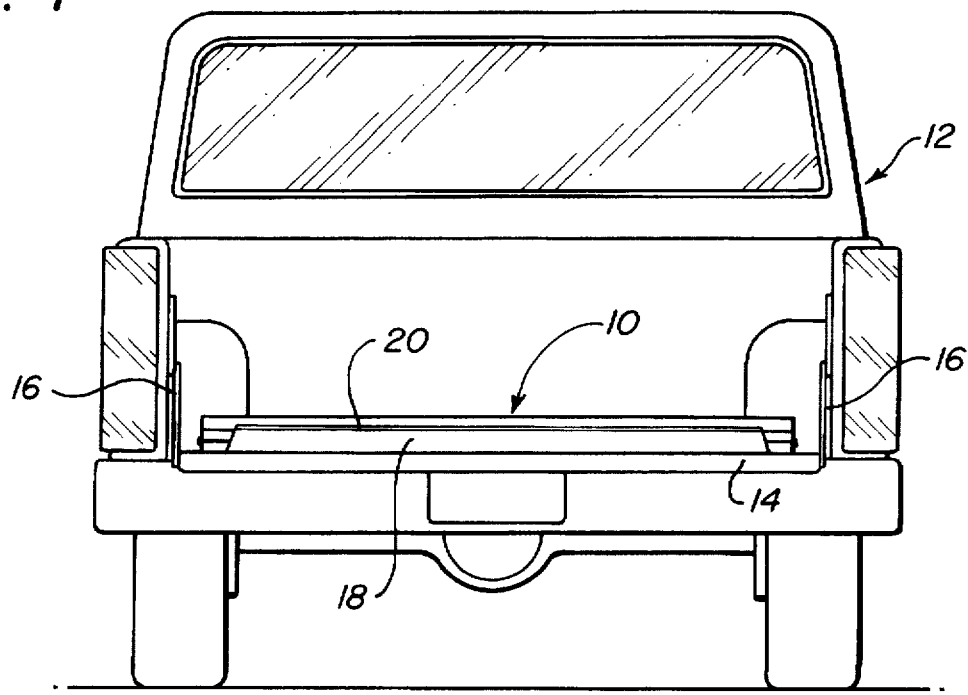
FIG. 1 is a front elevational view of an apparatus of the present invention installed on an opened tailgate of a pickup truck.
Figure 2:
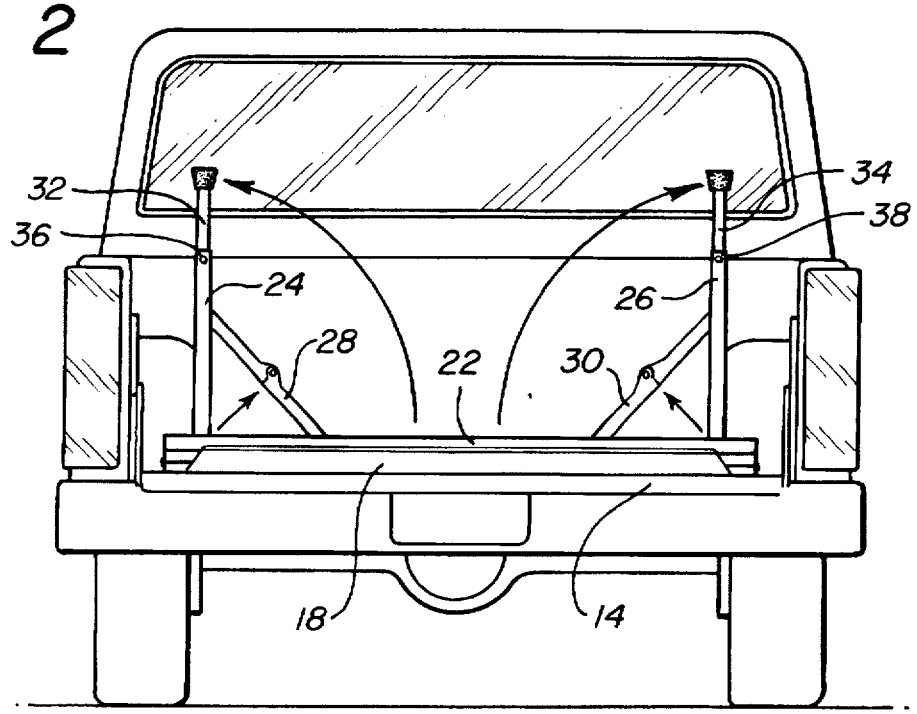
FIG. 2 is a front elevational view thereof with legs swung upwardly in preparation of swinging the apparatus out and to the rear of the tailgate.
Figure 3:
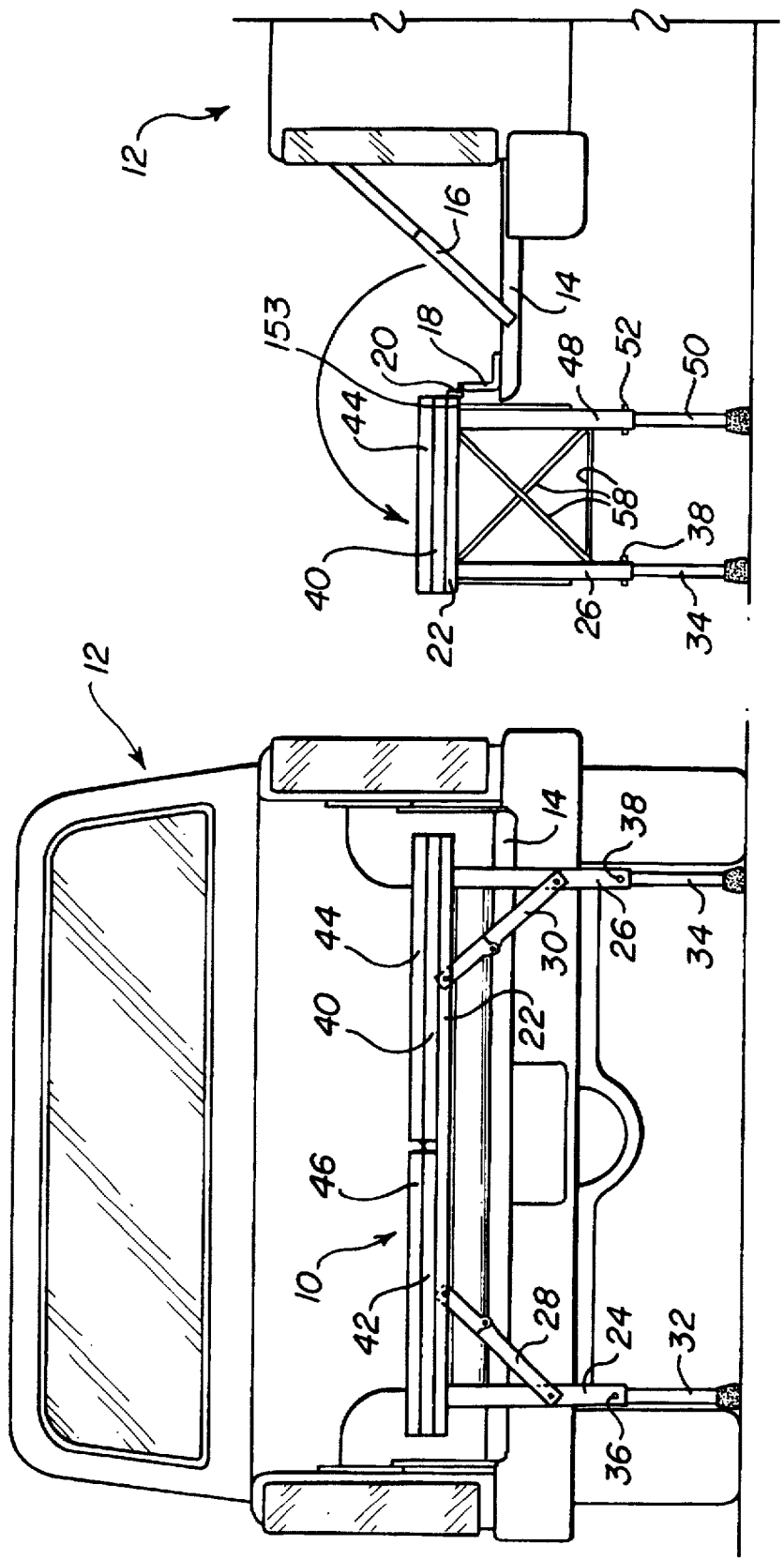
FIG. 3 is an front elevational view thereof with the apparatus swung out and to the rear of the tailgate.
Figure 4:
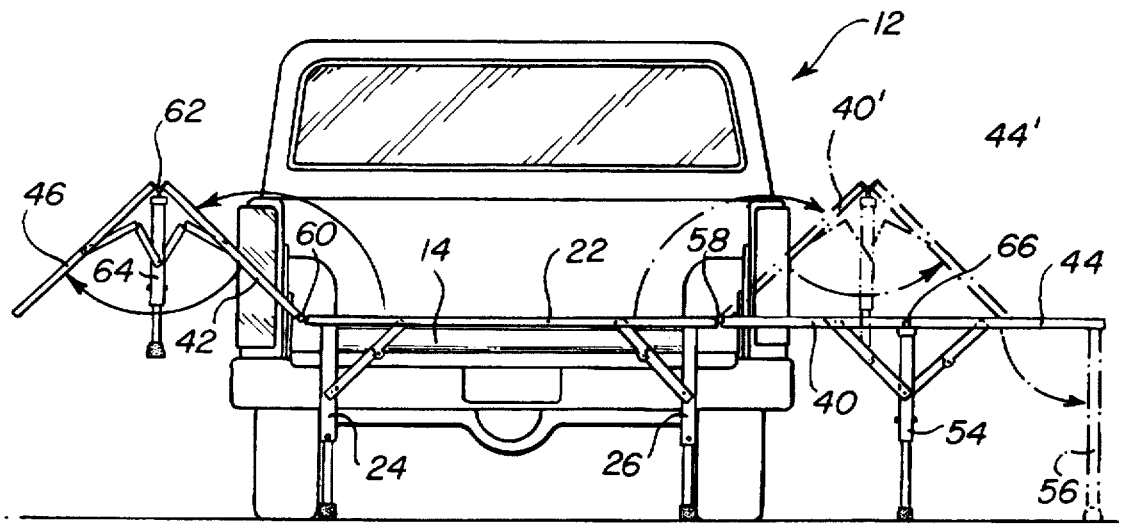
FIG. 4 is a front elevational view similar to that of FIG. 3 with end sections swinging upwardly and to the sides.
Figure 5:
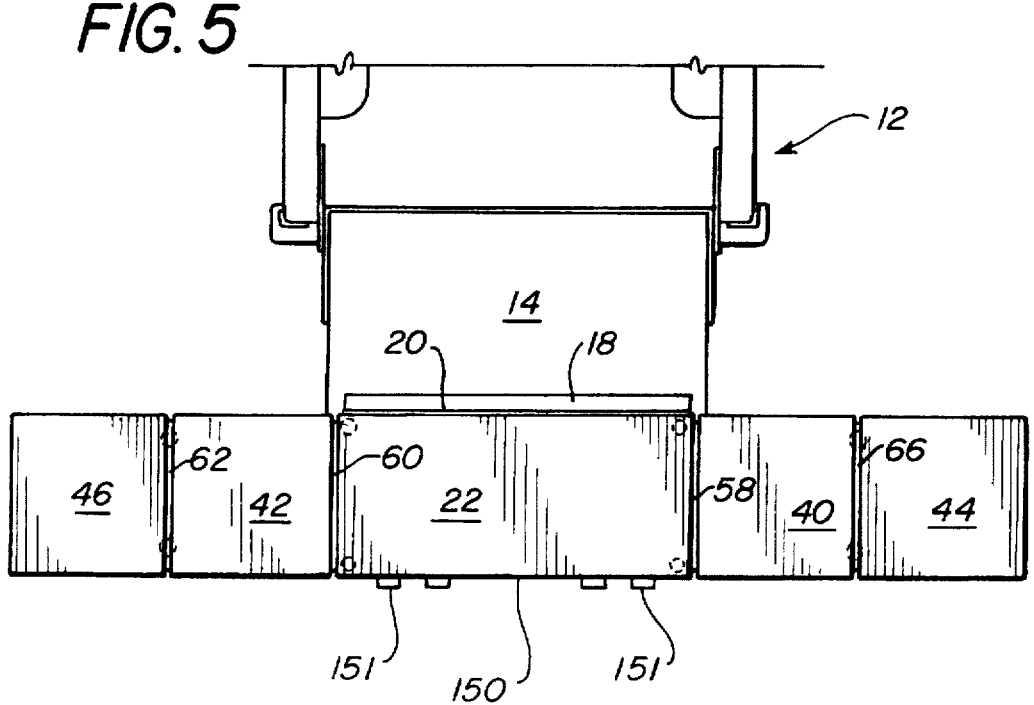
FIG. 5 is a top view thereof with the end sections in a working position extending the work surface to the sides.
Figure 6:
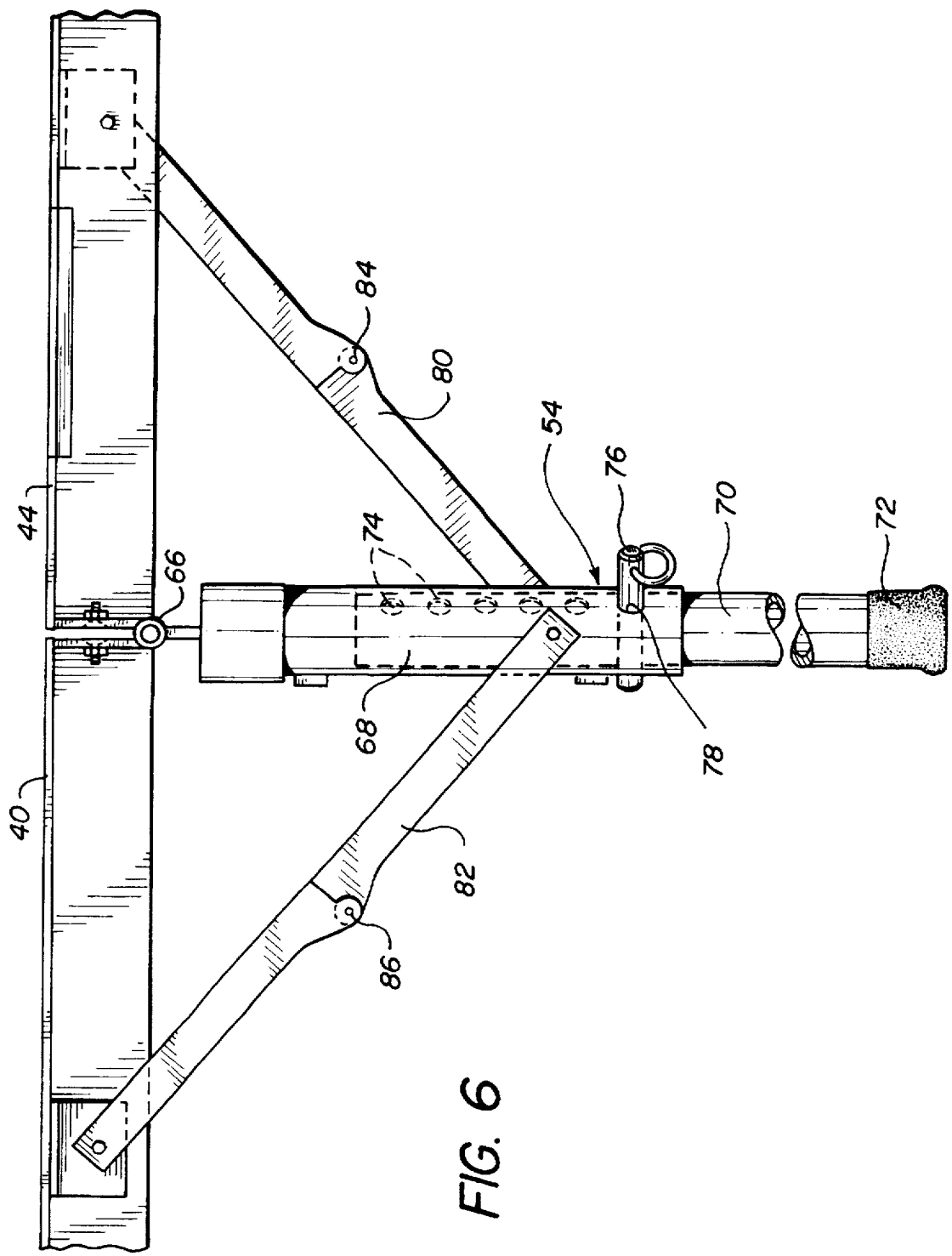
FIG. 6 is an enlarged front elevational view of an area shown in FIG. 4.

Apparatus 10 is pictured in FIGS. 1 through 6 in various stages of set up. In FIG. 1 apparatus 10 is shown in its storage mode attached by piano type hinge 20 to "L" shaped bracket 18 which is bolted to the inside surface of tailgate 14, supported by standard hinged strap supports 16 on truck 12 such that the apparatus 10 rotates about a horizontal axis with respect to the tailgate 14. The entire apparatus 10 is stored in an essentially unused space only about three inches thick. Various supplementary devices may be used to hold apparatus 10 in the storage mode including a bracket proximate the bottom of the apparatus to hold it against the inside surface of the tailgate, although a BUNGEE® cord will also suffice. In FIG. 2 legs 24 and 26 are swung upwardly to an upright position from central table section 22, which in this position is upside down. Legs 24 and 26 are reinforced by standard hinged lock leg support members 28 and 30 attached between the legs and the edge of section 22. Lower leg sections 32 and 34 telescope from and slide into tubular steel legs 24 and 26 respectively, and are locked at a chosen height with locking pins 36 and 38, respectively. Using the legs as levers, it is an easy movement to swing apparatus 10 upwardly and rearwardly of tailgate 14 to an upright position as shown in FIGS. 3 and 3a. In this position, central table section 22 is in its work position mode with right first end table section 40 and left first end table section 42 lying with their top surfaces facing downwardly abutting the top work surface of section 22. Hinge 58 connects the right end edge of section 22 to an inside edge of section 40 and hinge 60 connects the left end edge of section 22 to and inside edge of section 42. In the position shown in FIGS. 3 and 3a, right second and outside end table section 44 and left second end table section 46 lying with their bottom surfaces facing downwardly abutting the bottom surfaces of sections 40 and 42, which are upside down in this position. As is shown in FIG. 3 legs 24 and 26 are the rear legs of leg pairs that support section 22, with one leg supporting the rear corner and the other leg supporting the front corner. As shown the pair of legs on the right side of section 22 are leg 26 and front leg 48, which is equipped with lower telescoping height adjustment section 50 lockable to a chosen height with lock pin 52. Likewise leg 24 is coupled with a front hidden leg essentially identical to leg 48. Further the legs shown in FIG. 4, all have corresponding essentially identical front legs hidden in that view. Each pair of front and back legs have cross bracing between them essentially identical to cross bracing 51 shown in FIG. 3a between legs 26 and 48. Continuing with FIG. 4, sections 40, 42, 44, and 46 have or are in the process of being folded outwardly to the right and to the left from the right and left ends of section 22. Sections 40 and 44, extending to the right, are shown in the working position mode with their working surfaces facing upwardly, supported on leg pairs 54 and 56, which are identical to leg pair 26 and 48. An interim position is shown with sections 40' and 44' in a shadow view in the process of being folded outwardly. Likewise sections 42 and 46 are in the same interim position before a folded up leg pair is swung downwardly from the outer edge of section 46 to support those sections in combination with leg pair 64. Hinge 58 connects the right end edge of section 22 to the inside edge of section 40, while hinge 66 connects the outer or right edge of section 40 to the inside or left edge of section 44. Hinge 60 connects the left end edge of section 22 to the inside or right edge of section 42, while hinge 62 connects the outer or left edge of section 42 to the inside or right edge of section 46. In the top view of FIG. 5 apparatus 20 is shown fully deployed extending a full sixteen feet in length. The width of the individual sections may vary from about nineteen to about twenty-four inches in width, front to back to fit easily on the inside surfaces of tailgates, which vary in height from about twenty-four to about twenty-eight inches. For greatest flexibility half hinges are provided, but because of the necessary scale are not shown, on essentially each edge of each table section. Two half hinges are provided on the rear edge of section 22 so that the right extension composed of sections 40 and 44 can be connected to extend to the rear, with or without the side by side connection of the left extension composed of sections 42 and 46. Likewise a half hinge on the outer right edge of section 44 allows the left extension composed of sections 42 and 46 to be connected on the outer end of the right extension to form a sometimes necessary shape. All hinge connections are made using a quick easily removable hinge pin for easy and versatile shape combinations. Because of the adjustable height legs a gull shaped work surface can be made by raising up the leg pairs 54, 56, 64, and the one hidden in FIG. 4 at the outer end of section 46 to raise the work surfaces of sections 44 and 46 to a height well above that of section 22. Sections 40 and 42 will be angled upwardly and outwardly to join the outer sections. This configuration allows a miter box to be placed on top of section 22 and a work piece to rest horizontally flat on sections 44 and 46 for sawing purposes. Likewise a sidewise or rearward ramp shape may be formed. The entire set of table sections can be detached from the tailgate and rolled on a dolly to be used detached from the truck in a stand alone mode. In FIG. 6 leg 54 is shown in an enlarged view with lower section 70 cut away with rubber foot 72 closing off the bottom end section 70. Upper section 68 is a cylindrical tube into which an upper portion of section 70 slides. Holes 74 are spaced apart at one-half to one inch intervals along the length of section 70 for chosen height alignment with hole 78 through a lower end of upper section 68. Pin 76 interfits through hole 78 into a chosen hole 74 to hold a chosen leg height. Tubes 68 and 70 may be aluminum or steel tubing, while supports 80 and 82 are preferably steel. Standard hinged support members 80 and 82 are attached at forty-five degree angles from outer points on the edges of table sections 44 and 40, respectively, to upper section 68. Members 80 and 82 break in the middle with the halves attached in the middle through pivot pins 84 and 86, respectively. Half hinge 44 allows connection of sections 42 and 46 through engagement of a complimentary half hinge on the inner edge of section 42 to form an "L" shaped work table surface.

The table top sections are constructed of one eighth inch thick aluminum sheet with the edges formed to provide increased rigidity to a total thickness of about one inch. The fold out legs and cross bases fold into the cavity formed by the downward depending edges. Bracket 18 is constructed of one quarter inch thick L-shaped aluminum extrusion with a length-wise piano hinge along the upper edge bolted directly into the sides of table section 22. The size of the table top sections varies depending upon the size of the pick-up truck and the rear tailgate surface. For a full size pick-up truck, a sixty four inch long center section fits on the tailgate with the end sections being one-half of that length or about thirty two inches long each. The adjustable legs allow the height of the table surface to range from about twenty-four to about forty-four inches above ground level. For the full size pick-up truck, the total table length extend to about sixteen feet. For compact trucks the size is smaller to fit on the tailgate.

While this invention has been described with reference to specific embodiments disclosed herein, it is not confined to the details set forth and the patent is intended to include modifications and changes which may come within and extend from the following claims.

I claim:

1. A work bench apparatus comprising:
   (a) a work bench comprising:
      (i) an elongate central table section comprising an upper work surface, a lower surface, a front lengthwise edge, a rear lengthwise edge, and end edges,
      (ii) a pair of elongate end table sections each comprising an upper work surface, a lower surface, a near end edge, and a outer end edge,
      (iii) a plurality of hinge attachment means to detachably and hingeably attach adjacently positioned edges of the table sections together comprising a means to detachably hingeably attach the near end edges of the end table sections to the end edges of the central table section allowing the end table sections to swing from a first position with the upper work surfaces of the end table sections abutting the upper work surface of the central table section to a second position with the end table sections in a horizontal position with the upper work surfaces of the end table sections facing upwardly,
         wherein, when all table sections are in their respective first positions, the size and shape of the end table sections allow the combination of the upper work surfaces of both of the end table sections to abut and be essentially coterminous with the upper work surface of the central table section at same time, and
      (iv) pivotably attached leg means to support the work bench apparatus at a chosen height with the upper work surfaces of all the table sections facing upwardly, and
      (v) a pair of elongate second end table sections each comprising an upper work surface, a lower surface, a near end edge, and a outer end edge,
      (vi) a second means to detachably hingeably attach the outer end edges of the end table sections to the inner end edges of the second end table sections allowing the second end table sections to swing from a first position with the lower surfaces of the second end table sections abutting the lower surfaces of the end table sections to a second position with the second end table sections in a horizontal position with the upper work surfaces of the second end table sections facing upwardly,
         wherein, when all table sections are in their respective first positions, the size and share of the second end table sections allow the lower surfaces of both of the second end table sections to abut the lower surfaces of the end table sections at same time,
   (b) means to detachably attach the work bench to an inside surface of a tailgate of an truck comprising:
      (i) means to detachably attach the front rear lengthwise edge of the elongate central table section to inside surface of a tailgate, and
      (ii) means to allow the work bench to swing from a first work bench position abutting the inside surface of the tailgate to a second work bench position with the upper work surface of the elongate central table facing upwardly and positioned outwardly and rearwardly from the tailgate while still attached to the tailgate.

2. The apparatus of claim 1 wherein the leg means are individually lengthwise adjustable.

3. The apparatus of claim 2 wherein the leg means comprises:
   (a) legs depending from the lower surface proximate all four corners of the central table section,
   (b) legs depending from lower surfaces proximate ends of the hinge attachment means attaching the outer edges of the end table sections and the inner edges of the second end table sections, and
   (c) legs depending from the lower surfaces of the second end table sections proximate ends of the outer edges thereof.

4. A work bench apparatus comprising:
   (A) means to detachably attach a work bench to an inside surface of a tailgate of a truck and to provide the capability of swinging the work bench from a first bench position abutting the inside surface of the tailgate to a second bench position outwardly and rearwardly from the tailgate while still attached to the tailgate,
   (B) the work bench comprising:
      (i) an elongate central table section comprising an upper work surface, a lower surface, a front lengthwise edge, a rear lengthwise edge, and end edges,
      (ii) a pair of elongate first end table sections each comprising an upper work surface, a lower surface, a near end edge, and a outer end edge,
      (iii) a pair of elongate second end table sections each comprising an upper work surface, a lower surface, a near end edge, and a outer end edge,
      (iv) a plurality of hinge attachment means to detachably and hingeably attach adjacently positioned edges of the table sections together comprising:
         (a) a first means to detachably hingeably attach the near end edges of the first end table sections to the end edges of the central table section allowing the first end table sections to swing from a first position with the upper work surfaces of the first end table sections abutting the upper work surface of the central table section to a second position with the first end table sections in a horizontal position with the upper work surfaces of the first end table sections facing upwardly, and
         (b) a second means to detachably hingeably attach the outer end edges of the first end table sections to the inner end edges of the second end table sections allowing the second end table sections to swing from a first position with the lower surfaces of the second end table sections abutting the lower surfaces of the first end table sections to a second position with the second end table sections in a horizontal position with the upper work surfaces of the second end table sections facing upwardly,
            wherein, when all table sections are in their respective first positions, the size and shape of the first end table sections allow the upper work surfaces of both of the first end table sections to abut the upper work surface of the central table section at same time,
            wherein, when all table sections are in their respective first positions, the size and shape of the second end table sections allow the lower surfaces of both of the second end table sections to abut the lower surfaces of the first end table sections at same time, and (v) pivotably attached leg means to support the work bench apparatus at a chosen height with the upper work surfaces of all the table sections facing upwardly.

5. The apparatus of claim 4 wherein the leg means are individually lengthwise adjustable.

6. The apparatus of claim 5 wherein the leg means comprises:

(a) legs depending from the lower surface proximate all four corners of the central table section, (b) legs depending from lower surfaces proximate ends of the hinge attachment means attaching the outer edges of the first end table sections and the inner edges of the second end table sections, and (c) legs depending from the lower surfaces of the second end table sections proximate ends of the outer edges thereof.

7. The apparatus of claim 4 wherein the plurality of hinge attachment means further comprises third means to detachably hingeably attach the near edges of the first end table sections to the rear lengthwise edge of the central table section.

* * * * *